May 31, 1955  D. M. POTTER  2,709,755
FLOW METER
Filed Feb. 15, 1951  2 Sheets-Sheet 1
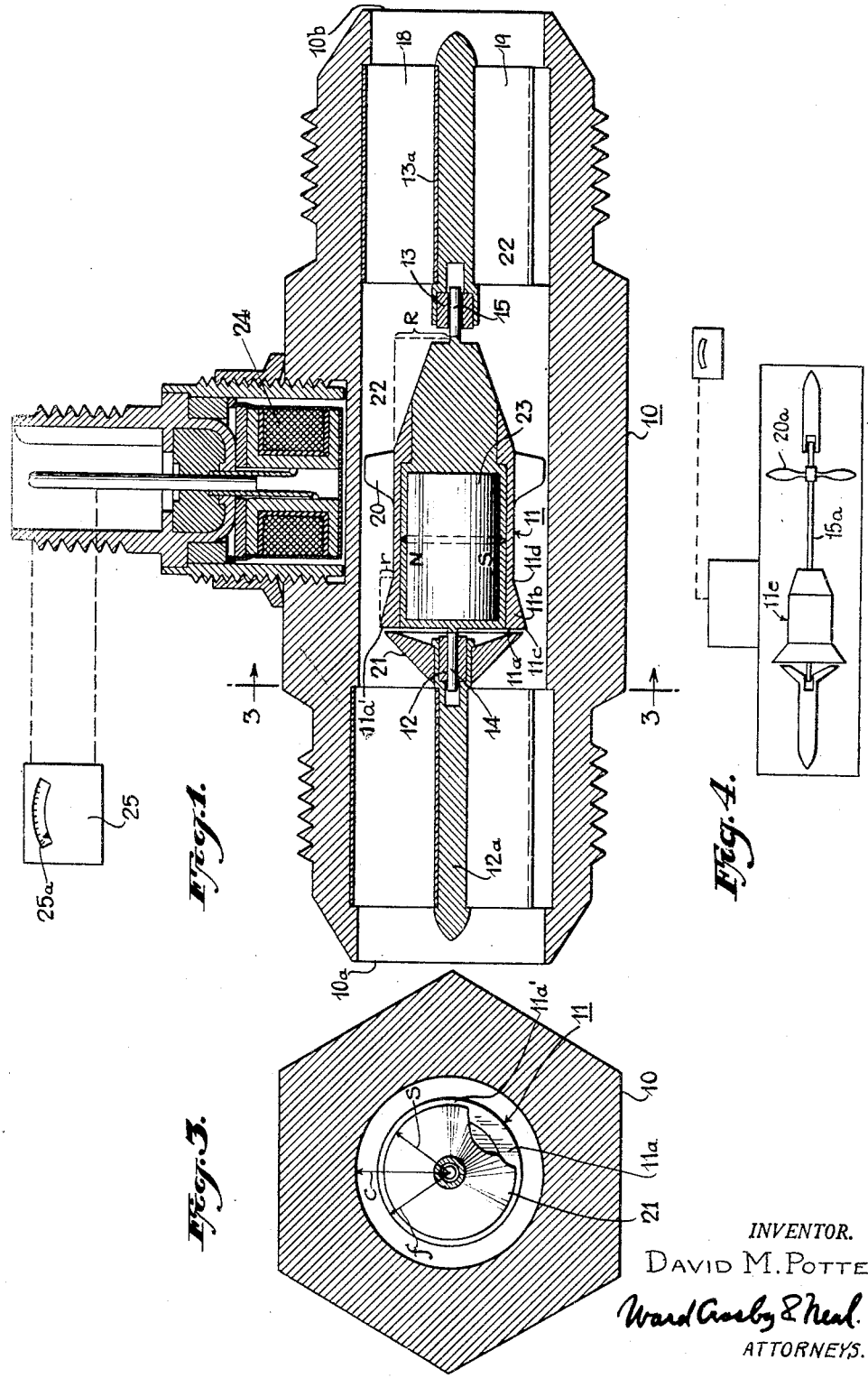
INVENTOR.
DAVID M. POTTER
Ward Crosby & Neal
ATTORNEYS.

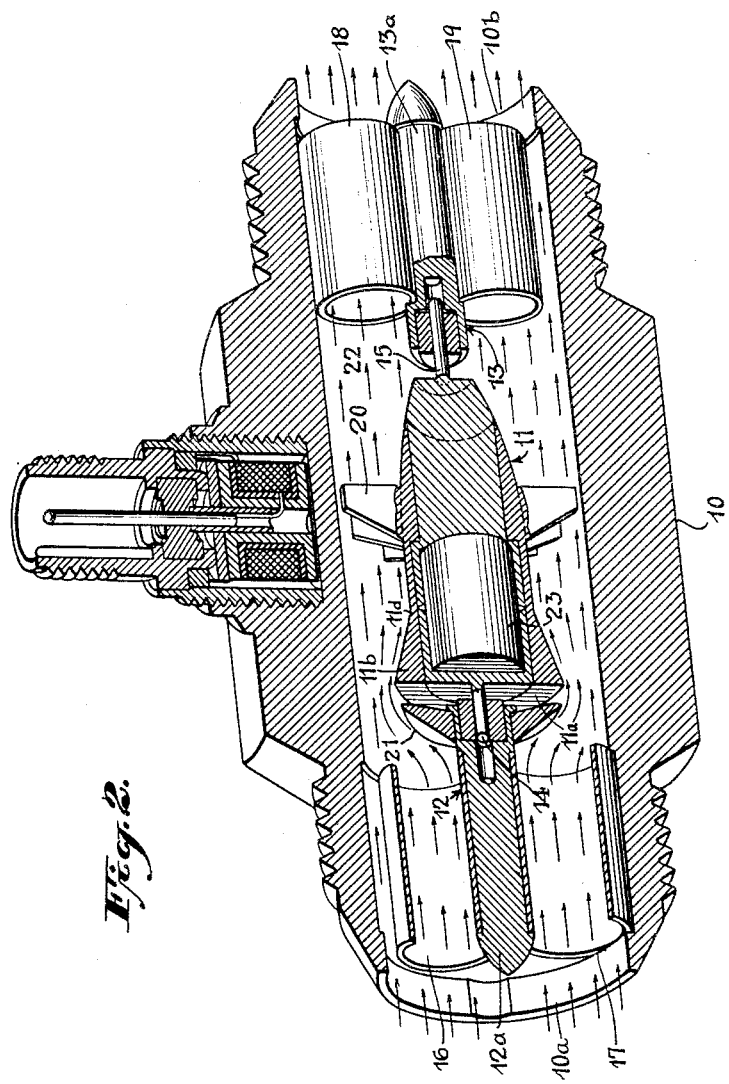

United States Patent Office 2,709,755
Patented May 31, 1955

2,709,755

FLOW METER

David M. Potter, Plainfield, N. J.

Application February 15, 1951, Serial No. 211,045

15 Claims. (Cl. 290—52)

This invention relates to fluid metering devices, and more particularly to at fluid flow meter of the so-called rotor type.

The invention herein described embodies certain improvements over the structure described in my copending United States patent application Serial No. 130,652, filed December 2, 1949, for Flow Meter.

Apparatus of this nature suggested in the past, with the exception of that disclosed in said copending application, have been subject to considerable disadvantage in that thrust bearings for the rotor have been necessary for absorbing thrusts acting in a downstream direction. Such thrust bearings normally have been subject to undesirable friction, heavy wear and deterioration, particularly where the velocity head of the fluid passing therethrough is substantial. Moreover, such bearings are subject to fouling by foreign particles which usually results in the failure of the bearing and consequent necessary replacement or at least in the necessity for disassembling the apparatus to clean the bearings.

One of the objects of the present invention is to overcome the above difficulties or to reduce same to insignificance and also to provide a flow meter of the rotor type wherein there is no decrease in the area for the passage of the fluid as the flow of such fluid is increased therethrough.

The invention in one aspect thereof comprises a conduit or conduit section having a passage therethrough of substantially uniform cross-sectional area. A rotor is mounted in the passage for rotational movement therein upon supporting means which also permit movement axially of the passage, that is, movement in either an upstream or a downstream direction within preselected limits. The apparatus is so constructed and arranged that the forces attributable to fluid velocity and pressure head which urge the rotor downstream are balanced by forces attributable to fluid pressure head which urge the rotor upstream, there being thus no necessity for bearings to absorb thrust in either an upstream or a downstream direction when in such a balanced condition. The rotor is provided with impeller blades which, in coaction with the fluid induce rotation of the rotor, the radius of the blades being substantially equal to but slightly less than the inner diameter of such passage. The rotor, of course, is mounted coaxially in said passage and constitutes a substantial reduction in the orifice available for the passage of the fluid. In order to eliminate the necessity for bearings to absorb thrust axially of the rotor, a shield is positioned upstream relative to the rotor, such shield preferably being of similar cross-sectional shape to the upstream face or end area of the rotor, for example, circular. Thus there is created an area of high pressure head acting on the downstream end areas of the rotor and one of low pressure head acting on the upstream end areas thereof. An unbalance of forces acting on the rotor would ordinarily occur provided the cross-sectional area of the shield were substantially identical with the cross-sectional area of the rotor because the effects of velocity head urging the rotor downstream would be substantially eliminated upon the upstream face of the rotor whereby the relatively large pressure head urging said rotor upstream would cause the rotor to engage the shield. This result is prevented by forming the upstream face or end area of the rotor slightly larger than the cross-sectional area of the shield whereby there is a marginal or annular shaped area on the upstream face of the rotor which protrudes beyond the shield a preselected small amount, thereby giving a rise to a downstream force, when in operation, which is attributable to velocity head and which, in combination with all of the other forces acting upon the rotor, will balance same at a certain axial position relative to the shield, thereby eliminating the necessity for axial thrust bearings. Such other forces acting on the rotor include a downstream force which is a function of the area and angularity of said blades. The upstream portion of the rotor is preferably slightly enlarged in average cross-sectional area as compared to the balance of the rotor. Suitable means are provided for producing an electrical signal in response to the angular velocity of the rotor whereby fluid flow can be measured.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the device herein disclosed.

In the drawings:

Fig. 1 is a longitudinal sectional view, partly in section and with parts broken away, of one form of apparatus embodying the present invention;

Fig. 2 is a perspective view on a slightly different scale of the apparatus shown in Fig. 1;

Fig. 3 is a cross-sectional view taken substantially on line 3—3 of Fig. 1; and

Fig. 4 is a schematic representation of a modified form of the structure shown in Fig. 1.

Referring to the drawings in further detail, the novel flow meter is constituted by a conduit or conduit section 10 having an upstream or inlet extremity 10a and a downstream or outlet extremity 10b.

A rotor or balance member is generally indicated at 11 mounted within the conduit 10 for rotational and axial movement therein, that is, the rotor 11 is provided with a mounting in which it may shift angularly in rotational movement and may move upstream or downstream within preselected limits. Such mounting is constituted, in the form shown, by upstream and downstream bearings 12 and 13, respectively, for supporting the upstream and downstream shafts 14 and 15, respectively, such shafts, for example, being rigidly secured to the rotor. The upstream bearing is held in position by any suitable means, for example, by hollow cylindrical metal supporting members best shown in Fig. 2 at 16 and 17. A third such cylindrical supporting member is employed but is not shown in this figure for purposes of clarity. Such cylindrical support members are arranged with the axes thereof parallel to the direction of flow. The supporting members 16 and 17 rigidly position a rod-like member 12a, in the downstream extremity of which is held said bearing 12 which is coaxial with such rod-like member.

The bearing 13 is held in position by analogous means including hollow cylindrical supporting members as at 18 and 19 which rigidly position a rod-like member 13a, in the upstream extremity of which is the bearing 13 which also is coaxial with member 13a.

The above-mentioned rotor 11 comprises, in the form shown, a balance member within the purview of this term as employed in my said copending application Serial No. 130,652 in that under the influence of the forces acting thereupon it may be held substantially in a constant position along the longitudinal axis of the conduit by means of balanced forces resulting from fluid pressures in the conduit. The rotor 11 is referred to interchangeably as a balance member herein. It is provided with impeller or rotor blades 20 whereby it is rotated at a velocity which is a function of the fluid flow. It is within the purview of this invention to remove the blades from the rotor or balance member 11 and to position them elsewhere in the conduit 10 where they may form a rotatable member which is restrained from axial movement in the conduit by some suitable connection with the balance member. The fluid flow, of course, is metered by measuring the angular velocity of the rotating element in whatever manner it may be associated with the remainder of the apparatus, that is, whether it is separated from or merged with the balance member.

There is shown in Fig. 4 the aforementioned form of the invention wherein a bladed member, as at 20a, is separated from a balance member, as at 11e, such members being connected together for rotation with one another by means of a shaft 15a. Otherwise the form shown in Fig. 4 is similar to that shown in the previous figures.

The rotor 11 in the passage of the conduit 10, of course, comprises an obstruction to fluid flow therethrough creating a region of high fluid velocity in the orifice formed between the rotor and the inner surfaces of the passage. Thus there are formed regions of relatively high pressure head and relatively lower velocity head near the upstream and downstream extremities of the rotor 11. In order that the rotor or balance member 11 may be held substantially stationary under the influence of fluid pressures only and without the aid of thrust bearings within the conduit, a shield 21 is positioned adjacent the upstream face of the rotor thereby nullifying to a preselected extent the effect of velocity head upon such upstream rotor face. The shield 21, in the form shown, comprises a solid of revolution which is generally cone-shaped having a "hollowed out" bottom face. Said shield is rigidly mounted upon the rod-like member 12a and surrounds the bearing or journal 12. The maximum diameter of the shield 21 is slightly less than the diameter of the upstream face of the rotor 11, such upstream face being indicated at 11a. Thus there is a marginal portion of the face 11a, best shown in Fig. 3 at 11a', which protrudes radially outwardly from the shield 21 and when exposed to the stream of fluid is acted upon by a velocity head creating a downstream force of preselected magnitude, that is, creating a force tending to urge the rotor downstream.

The forces acting on the rotor 11 are as follows:

I. *Downstream*

(a) Force due to velocity head acting upon the protruding marginal portion 11a';

(b) The downstream component of force acting upon the impeller or rotor blades 20 also due to fluid velocity head;

(c) Force due to pressure head acting upon the upstream face 11a of the rotor.

II. *Upstream*

(a) Force acting upon the projected cross-sectional area of the rotor 11 due to pressure head in the region 22, that is, upon the annular portion of the projected cross-sectional area having width R. (Note: This area is in effect annular shaped because of the cross-sectional area of the rotor shaft 15 upon which the effect of such pressure head is largely eliminated.)

(b) Force due to pressure head acting upon the projected portion of the cross-sectional area of the rotor, such portion also being annular shaped and having a width r.

The term "downstream facing areas" refers to those areas of the rotor which face downstream and upon which a pressure head differential is capable of exerting a force acting in an upstream direction. For example, the aforementioned areas having widths R and r are embraced by the expression "downstream facing areas" and particularly refers to the projected cross sectional areas having such widths.

It will be seen that the upstream region of the rotor member is relatively enlarged, that is, it tapers in the direction of the fluid flow from a maximum diameter at the upstream face 11a thereof adjacent the shield 21. It has been found desirable, but not necessary, so to diminish the cross-sectional area of the rotor 11, that is, to taper same in the region 11b, for example, between the points 11c and 11d, in order: (a) to lighten the rotor; and (b) to provide a region of somewhat lower fluid velocity relative to that occurring at the maximum diameter of the rotor. At such region of lower fluid velocity there is a corresponding lower downstream drag. However, the invention is not limited to such diminishing of the cross-sectional area of the rotor 11 and it is possible for the rotor to be, for example, of substantially uniform cross-sectional area provided there is suitable overlap thereof radially beyond the shield 21, for example, as shown at 11a'.

It is not absolutely necessary for the rotor or balance member 11 to be axially shiftable within the conduit but it has been found desirable so to mount it in order to avoid shocks due to the surging of fluid through the conduit wherein a sudden reciprocating movement of such balance member may occur.

It was mentioned above that the downstream face of the conical shield 21 is hollowed out. This is considered desirable in order to minimize a so-called water-brake effect which might otherwise tend to slow down the rotor. If the downstream face of the shield 21 were, for example, flat and thus perpendicular to the axis of the conduit, there would be a tendency to retard the angular movement of the rotor 11 because of a braking action communicated from such stationary shield face through the liquid to the upstream face of the rotor. One of the main reasons for forming the upstream rotor face larger than the downstream face of the shield is to prevent the rotor from actually engaging such latter face.

Referring now to Fig. 3, the relationship between the upstream face of the rotor 11 and the downstream face of the shield 21 is illustrated. The importance of this relationship and its significance as to fluid flow within the conduit 10 is related to the annular areas surrounding such shield at its maximum diameter to an analogous area surrounding the upstream face of the rotor.

For purposes of measurement of fluid flow and the calculation of velocity head forces upon the balance member, the difference in such annular shaped areas should be considered, that is, it is desirable to describe the relationship between such shield face and rotor face in terms of surrounding annular areas as opposed to the projected areas of the faces per se. In Fig. 3 it will be seen that the annular area $A_1$ surrounding the shield 21, which is available for fluid flow, is expressed as follows:

$$A_1 = \pi(c^2 - s^2)$$

wherein $c$ is the inner radius of the conduit 10, $s$ the maximum radius of the shield 21.

The area $A_2$ surrounding the upstream face of the rotor is expressed as follows:

$$A_2 = \pi(c^2 - f^2)$$

wherein $f$ is the diameter of the upstream rotor face.

In view of the fact that $s$ is less than $f$, $A_2$ is less than $A_1$ or:

$$\pi(c^2-f^2) < \pi(c^2-s^2)$$
$$A_2 < A_1$$

As above mentioned, the shield 21 is located near and upstream relative to the balance member in order to counteract to a preselected degree the force due to dynamic pressure, that is, the effect of velocity head upon such member, such force acting downstream. Such partial counteraction has the effect of permitting the relatively higher pressure head acting in the region 22 to force the balance member upstream which, in the absence of the marginal area 11a', would cause the face 11a to engage the shield 21. However, the effect of velocity head upon the annular area 11a' effects a balance of forces in combination with the others acting thereupon as set forth above where the rotor 11 may be held axially stationary under the influence of the forces created by the fluid flow through the conduit.

The speed of rotation of the rotor 11 and thus the rate of flow of the fluid through the conduit 10 can be measured by well known electrical means comprising, in the form shown, a ring magnet as at 23 mounted within the body portion of the rotor. Such magnet is in electrical cooperation by magnetic coupling with a coil 24 which in turn is electrically connected to an electrical tachometer or frequency meter 25. An alternating current thus can be generated in the coil 24, the frequency of which is a direct function of the r. p. m. of the rotor, such frequency being measurable by the instrument 25 and indicated as a rate of flow by means of suitable indicia as at 25a.

In operation, fluid is directed through the conduit 10 usually at high velocity and the balance member or rotor 11 is held substantially in a constant position along the longitudinal axis of the conduit by the balanced forces resulting from the fluid pressures therein, that is, the resultant of forces acting to force such rotor downstream are balanced by the resultant of forces tending to force same upstream. The fluid, of course, engages the rotor blades 20, rotating the rotor at a speed which is a function of the flow rate. A region of relatively low pressure head and one of relatively high pressure head are created in response to the flow of fluid through the conduit by means of a change in the cross-sectional area of the fluid passageway, for example, by reducing such cross-sectional area by the positioning of the rotor 11 therein. The diameter of the rotor blades being substantially equal to but slightly less than the diameter of the passage in the conduit, there will be little slippage and the R. P. M. of the rotor will be substantially directly proportional to the fluid flow. The diameter of the rotor body, of course, is substantially less than the diameter of the rotor blades. The downstream portion of the balance member is subject to the above-mentioned relatively high pressure head which produces a force acting to move same upstream. The shield 21 counteracts to a preselected partial degree the force due to dynamic pressure acting upon the rotor, such force acting downstream. The downstream force due to velocity head acting upon the marginal area 11a', plus the force due to relatively low pressure head (downstream) acting upon the upstream face of the rotor, plus the downstream component of velocity head acting upon the blades 20, are balanced against the force acting upstream due to the relatively high pressure head existing in region 22 as compared to that at 11a and also acting upstream in the region of the relatively enlarged portion 11b.

Axial movement of the rotor or balance member 11 in no way restricts the orifice available for the passage of fluid through the conduit 10.

There is thus provided novel means for measuring the flow of fluid through the conduit, which means are capable of passing heretofore unattained high quantities of fluid through a small orifice in a given time and for measuring same with high accuracy. The means are simple in construction and highly sensitive in operation and do not require thrust bearings to absorb up or downstream thrusts.

While the invention has been described with respect to a certain preferred example which has given satisfactory results, it will be understood by those skilled in the art after understanding the invention that various changes and modifications may be made without departing from the spirit and scope of the invention, and it is intended therefore in the appended claims to cover all such changes and modifications.

What is claimed as new and is desired to be secured by Letters Patent is:

1. In apparatus of the class described: a conduit section having a passage therethrough of substantially uniform cross-sectional area, such section having an upstream and a downstream extremity; a rotor mounted in said conduit section substantially coaxially therewith for axial and rotational movement therein, said rotor having impeller blades secured thereto, the diameter of such blades being substantially equal to but slightly less than the inner diameter of such passage, the diameter of said rotor being smaller than that of said passage thereby to form a restriction therein but allowing fluid flow therethrough in the space between such rotor and conduit, a region of relatively low pressure head being produced in such space and a region of relatively high pressure head being produced in the region around the downstream end areas of such rotor in response to fluid flow, said rotor also having an enlarged balance portion at the upstream extremity thereof, such balance portion tapering in the direction of flow of fluid through such passage, such balance portion having an upstream face of preselected diameter; and a shield fixedly mounted in the passage of said conduit section coaxially with said rotor, upstream relative to such balance portion and having a preselected diameter slightly less than that of the upstream face of such balance portion, the angularity of such blades and the difference in diameters of said shield and upstream face being selected to produce in response to fluid flow through such passage predetermined components of force acting downstream due to pressure and velocity heads for balancing against the force acting upstream on the aforementioned downstream end areas of said rotor and due to such higher pressure head at such areas, the downstream face of said shield being positioned closely adjacent to but spaced from the upstream face of said rotor during operation.

2. Apparatus in accordance with claim 1 including a coil member and a magnet member, one of said members being fixed and the other of said members being mounted upon said rotor for rotation therewith, said members being magnetically linked with one another.

3. In a flow meter, the combination comprising: a conduit section having a passage therethrough of substantially uniform circular cross-sectional area, and also having an upstream and a downstream extremity; a shield of circular cross-sectional area fixedly and coaxially positioned in such passage, such shield being of preselected diameter; a rotor mounted in said passage and including a relatively enlarged balance portion forming the upstream portion thereof, such upstream portion having an upstream face positionable adjacent the downstream face of such shield, such balance portion tapering in a downstream direction, said rotor having impeller blades secured thereto of a radius substantially equal to but slightly less than the radius of such passage; said shield and rotor coacting with said conduit for forming a restricted passageway in such conduit whereby, in response to fluid flow in such passage, regions of relatively high pressure head are created in the passage at the upstream extremity of such shield and the downstream extremity of said rotor, and a region of relatively lower pressure head is created intermediate such high pressure head regions in the space between the inner surface of said conduit and such restriction formed by said shield and rotor; and means for coaxially mounting said rotor for rotational and axial movement in such passage, the upstream face of such balance portion being of slightly greater diameter than the largest diameter of said shields the angularity of such blades and the extent by which the diameter of such upstream face is greater than such diameter of said shield being selected for producing forces acting downstream on said rotor due to fluid velocity head which, acting in combination with the downstream force acting on the upstream face of such balance portion due to said relatively lower pressure head, counterbalance the forces acting upstream on said rotor due to pressure head.

4. A flow meter, including in combination: a conduit having a passage therethrough; a rotor mounted coaxially in said conduit for rotation about the longitudinal axis of said passage, said rotor forming with said conduit a relatively contracted passageway thereby creating in response to the passage of fluid therethrough a region of relatively low pressure head at the sides of such rotor between the latter and said conduit and regions of relatively higher pressure head at opposite extremities of such rotor, the latter having a bladed impeller connected therewith and coaxially with said passage for coacting with the fluid passing through the conduit for rotating same; a shield member mounted coaxially in said conduit upstream relative to said rotor and adjacent thereto for counteracting to a preselected degree the effect of velocity head upon such rotor and also the effect of said relatively higher pressure head on the upstream end areas of said rotor, said rotor having a face extending beyond the periphery of such such shield, at least a portion of such rotor tapering in a downstream direction commencing at such upstream face thereof; and means for mounting said rotor for axial and rotational movement in said conduit, the area and angularity of the blades of said impeller and the extent of protrusion of said rotor face beyond said shield being selected for producing downstream forces acting on said rotor of preselected magnitude in response to fluid flow in said passage, which forces in aggregate are balanced against a force urging said rotor upstream due to the aforementioned relatively higher pressure head acting on the downstream end areas of such rotor.

5. The combination including: a conduit having a passage therethrough; a fixed shield member mounted coaxially in such passage; a rotor positioned downstream relative to said fixed shield member and mounted for rotation coaxially of such passage and also mounted for movement axially in such passage, such shield member and rotor cooperating with said conduit for forming a restricted passageway in said conduit whereby regions of relatively high pressure head are created in the passage at the upstream extremity of such shield and the downstream extremity of said rotor, and a region of relatively lower pressure head is created intermediate such high pressure head regions in the space between the inner surface of said conduit and the restriction formed by said shield and rotor; said rotor having an upstream extremity thereof adjacent said shield which is larger in diameter than that of said shield whereby a marginal portion of said upstream extremity extends beyond the edge of such shield, said rotor including impeller blades connected thereto for rotating same in response to the passage of fluid through said conduit, the angularity of said blades and the extent of such marginal portion being selected for producing forces acting downstream upon said rotor due to fluid velocity head which, together with the downstream force acting on said upstream rotor extremity due to said relatively lower pressure head, counterbalance the forces acting upstream on the downstream facing areas of said rotor due to said relatively high pressure head.

6. Apparatus in accordance with claim 5 including: means magnetically linked with said rotor for producing a signal in response to the speed of rotation of said rotor.

7. In apparatus of the class described, a conduit section having a passage therethrough; a shield member positioned in such passage, said shield member having a downstream face; a rotor mounted within said conduit for axial movement within preselected limits therein, said rotor and shield member each having a maximum transverse cross sectional area which is smaller than that of said passage, said rotor having an upstream face positionable closely adjacent the downstream face of said shield member, a marginal portion of such upstream face extending radially beyond the edge of such shield, said rotor having a plurality of blades connected thereto for axial and rotational movement therewith, said blades comprising an impeller for inducing rotation of said rotor in response to the passage of fluid through the conduit, the extent of said marginal portion and the angularity of said blades being selected for reacting with fluid flowing in said conduit to produce forces acting downstream upon said rotor resulting from fluid velocity head which, acting in combination with a force acting downstream upon said upstream face due to a relatively low fluid pressure head, are capable of counterbalancing a force acting upon said rotor in an upstream direction due to relatively high fluid pressure head existing in the region of the downstream end areas thereof, said rotor in operation thus being subject to fluid pressures acting downstream which are balanced by fluid pressures acting upstream whereby such rotor is held in operating position without bearings for absorbing thrust acting in the direction of the longitudinal axis of the conduit.

8. In apparatus of the class described, a conduit having a passage therethrough, a shield fixedly mounted in such passage and having a downstream face, a rotor mounted for rotation in the passage and also mounted for axial movement therein within preselected limits, said rotor and shield each having a maximum transverse cross sectional area which is smaller than that of such passage, such rotor having an upstream face positionable closely adjacent the downstream face of such shield, such upstream face being of preselected larger area than such downstream face whereby a marginal portion of such upstream face extends radially beyond the edge of such shield; said shield and rotor together forming a restriction in the passage and creating regions of relatively high and low pressure head in said conduit in response to fluid flow through the passage, the region of high pressure head being created around the downstream end of said rotor, such high pressure head acting on the downstream end areas of said rotor tending to thrust same upstream, said region of relatively low pressure head being created in the fluid passageway between said rotor and conduit, said rotor having a bladed impeller secured thereto for axial movement therewith and for inducing rotation thereof in response to fluid passing through the conduit, said rotor having forces acting thereon in response to the passage of such fluid in the conduit which forces due to pressure head and velocity head acting on the upstream face of said rotor and velocity head acting on said blades tend to force said rotor downstream and which forces are balanced against forces due to the aforementioned high pressure head tending to force said rotor upstream, the angularity of said blades and the extent of said marginal portion being selected for effecting such a balance, said rotor in operation thus being subject to fluid pressures acting downstream which are balanced by fluid pressures acting upstream whereby such rotor is held in operating position without bearings for absorbing thrust acting in the direction of the longitudinal axis of the conduit.

9. In a flow meter, the combination comprising: a conduit having a passage therethrough, a shield having a downstream face and fixedly mounted in such passage; a rotor mounted for rotation in the passage and also mounted for axial movement therein within preselected limits, said rotor having an upstream face positionable closely adjacent the aforementioned downstream face of the shield, a marginal portion of such upstream face extending radially beyond the edge of the downstream face of said shield, said shield and rotor each being of smaller cross sectional area than said passage and together forming a restriction in such passage thereby creating regions of relatively high and low pressure head in response to fluid flow through the passage, the pressure in a region of such high pressure head acting on the downstream facing areas of said rotor tending to thrust same upstream, said region of relatively low pressure head being created in the fluid passageway between said rotor and conduit and said shield and conduit, said rotor having rotor blades secured thereto for axial movement therewith comprising an impeller for inducing rotation in said rotor in response to the flow of fluid through the passage; the extent of said marginal portion and the angularity of the blades of said impeller being selected for reacting with fluid flowing in said conduit to produce forces acting downstream upon said rotor resulting from fluid velocity head which, acting in combination with a force acting downstream upon the upstream face of the rotor due to the relatively low fluid pressure head, are capable of counterbalancing the forces acting upon the rotor in an upstream direction due to fluid pressure head acting on the downstream facing areas thereof, said rotor in operation thus being subject to fluid pressures acting downstream which are balanced by fluid pressure acting upstream whereby such rotor is held in operating position without bearings for absorbing thrust acting in the direction of the longitudinal axis of the conduit.

10. In a flow meter, the combination comprising: a conduit having a passage therethrough, a shield having a downstream face and fixedly mounted in such passage; the shield being of smaller cross sectional area than that of the passage and forming a restriction therein which, in response to the passage of fluid through the passage, creates a region of relatively low pressure around the periphery of said shield; a rotor having downstream facing areas and mounted for rotation in the passage and also mounted for free axial movement therein within preselected limits, said rotor having upstream facing areas a portion of which extends radially beyond the edge of the downstream face of said shield, said shield and rotor being in proximity, the latter downstream from the former and in operation with the upstream face of said rotor closely adjacent to but spaced from the downstream face of said shield, said shield and rotor together forming a restriction in such passage and creating regions having pressure head differential therebetween acting on such downstream facing areas of the rotor in response to fluid flow through the passage tending to thrust said rotor upstream, said rotor having rotor blades secured thereto comprising an impeller for inducing rotation of said rotor in response to the flow of fluid through the passage; the extent of said portion and the angularity of the blades of said impeller being selected for reacting with fluid flowing in said conduit to produce forces acting downstream upon said rotor resulting from fluid velocity head which, acting in combination with a force acting downstream upon the upstream face of the rotor due to said relatively low fluid pressure head, are capable of counter-balancing the forces acting in an upstream direction upon the downstream facing areas of said rotor due to such fluid pressure head differential, said rotor in operation thus being subject to forces acting downstream which are balanced by forces acting upstream whereby such rotor is held in operating position without bearings for absorbing thrust acting in the direction of the longitudinal axis of the conduit.

11. In apparatus of the class described, a conduit having a passage therethrough; dynamic fluid balancing means in said passage including: a shield fixedly positioned therein, a rotor having an upstream facing area extending radially beyond such shield, said rotor being positioned downstream with respect to said shield; means for mounting said rotor for movement in said conduit substantially axially thereof and substantially coaxial with said shield; said rotor including impeller blades connected thereto for rotating same in response to the flow of fluid through such passage; said shield and rotor in operation being closely adjacent to but spaced from each other and coacting with said conduit for producing a restriction in the passage therethrough in cooperation with the inner surfaces of such conduit whereby regions of relatively high pressure head are created in such passage at the upstream extremity of such shield and the downstream extremity of said rotor, and a region of relatively lower pressure head is created intermediate such high pressure head regions and about the periphery of said shield and rotor; the angularity of such blades and the extent of such upstream facing area which extends radially beyond such shield being selected for producing forces acting downstream on said rotor due to fluid velocity and pressure heads which counterbalance the forces acting upstream on the downstream end areas of such rotor due to said relatively high pressure head, said rotor in operation thus being subject to fluid pressure acting downstream which is balanced by fluid pressures acting upstream whereby such rotor is held in operating position without bearings for absorbing thrust in the direction of the longitudinal axis of the conduit.

12. In apparatus of the class described, a conduit having a passage; dynamic fluid balancing means in said passage including: a shield fixedly positioned therein, a rotor mounted substantially coaxially with said shield and having an upstream face which is positionable closely adjacent to but spaced from the downstream face of said shield and which protrudes radially beyond such shield face by a preselected area, means for rotatably mounting said rotor for movement in said conduit axially thereof within preselected limits, a rotatable impeller having a plurality of blades connected to said rotor for axial and rotational movement therewith, said shield and rotor jointly forming a restriction in such passage and producing regions of relatively high pressure head at the upstream extremity of said shield and the downstream extremity of said rotor and regions of relatively lower pressure head intermediate said high pressure regions; the angularity of said blades and the extent of said protruding area being selected to produce, in response to fluid flow through the passage, downstream forces acting on said rotor due to velocity and pressure head which counter-balance the upstream forces acting on said rotor due to said relatively high pressure head, whereby such rotor is held in operating position during rotation without bearings for absorbing thrust acting in the direction of the longitudinal axis of the conduit.

13. In apparatus of the class described, a conduit having a passage therethrough, a shield fixedly mounted in such passage, the shield being of smaller cross-sectional area than that of the passage and forming a restriction therein which in response to the passage of fluid through the passage creates a region of relatively low pressure around said shield; a member mounted for rotation in the passage and also mounted for free axial movement therein within preselected limits, such member having a cross-sectional shape corresponding to the cross-sectional shape of said shield but having a portion thereof of a cross-sectional area larger than that of said shield, said shield and member together forming a restriction in the passage and creating regions of relatively high and low pressure head in response to fluid flow through the passage, the pressure in such region of high pressure head acting on the downstream end areas of said member tending to thrust same upstream, said region of relatively low pressure head being created in the fluid passageway between said member and conduit, said member having rotor blades secured thereto; said member having preselected forces acting thereon due to pressure and velocity head tending to force same downstream which are balanced against forces due to high pressure tending to force said member upstream, the angularity of said blades and the difference in cross-sectional area of said member relative to said shield being preselected for effecting such a balance, and electrical means for producing electrical impulses in response to the rotation of such member, such electrical means being magnetically coupled to such member.

14. In apparatus of the class described, a conduit having a longitudinal axis, a member mounted in said conduit for rotation about such longitudinal axis, said member also being mounted for axial movement within preselected limits in said conduit, said member creating a restriction in the area available for fluid flow in said conduit, whereby in response to the flow of fluid therein there is created a region of relatively high pressure head in the region of the downstream end areas of said member and a region of relatively lower pressure and higher velocity head in the more restricted fluid passageway formed between said member and the inner surfaces of said conduit; a shield fixedly mounted in said conduit upstream and adjacent to said member of a maximum cross-sectional area which is less by a preselected amount than the maximum cross-sectional area of said member, such areas being normal to such longitudinal axis whereby a preselected force acts upon said member due to velocity head tending to force said member downstream, there being a preselected force due to pressure head acting upon the upstream end areas of said member also tending to force the latter downstream; a plurality of blades rigidly secured to said member for rotating same in response to fluid passing through said conduit, said blades also having a component of force acting thereupon tending to force same downstream, such component being a function of the angularity of said blades, the angularity of said blades and the difference of said cross-sectional areas of said shield and member being selected to create downstream forces which are balanceable against the force urging said member upstream due to the relatively high pressure head acting upon the downstream end areas thereof, said member in operation thus being subject to fluid pressures acting downstream which are balanced by fluid pressures acting upstream whereby such member can remain axially in substantially fixed position without bearings for absorbing thrust acting in the direction of the longitudinal axis of the conduit.

15. In apparatus of the class described, a tube; a shield fixedly mounted in said tube, said shield being of smaller cross-sectional area than that of the tube thereby forming a restriction, and in response to the passage of fluid through the tube creating a region of relatively low pressure around said shield and a region of relatively higher pressure on the downstream side thereof; a balance member in said tube on the downstream side of said shield, said balance member during operation being positioned closely adjacent to said shield, said member being of a cross-sectional shape corresponding to that of said shield but being of slightly larger cross-sectional area, the latter area being smaller than the cross-sectional area of the tube, said member in operation being subject to fluid pressures acting in a downstream direction which are balanced by fluid pressures acting in an upstream direction whereby such member can remain axially substantially in a fixed position; an impeller in said tube, means for connecting said member with said impeller for axial and rotational movement therewith, said impeller being rotatable by fluid passing through said tube; shaft means substantially coaxial with said tube and mounted therein for supporting said impeller and member, both said impeller and member being free to shift axially in said tube upon said shaft means within preselected limits; and means operatively connected to said impeller for producing a signal responsive to the speed of rotation thereof.

References Cited in the file of this patent

UNITED STATES PATENTS

| | | |
|---|---|---|
| 879,563 | Lohse | Feb. 18, 1908 |
| 1,400,523 | Chrisman | Dec. 20, 1921 |
| 2,058,302 | Faus et al. | Oct. 20, 1936 |
| 2,299,406 | Potter | Oct. 20, 1942 |

FOREIGN PATENTS

| | | |
|---|---|---|
| 186,574 | Germany | June 26, 1907 |